March 3, 1964   J. L. FIHE   3,122,934
POWER TRANSMISSION BELT
Filed Dec. 20, 1960
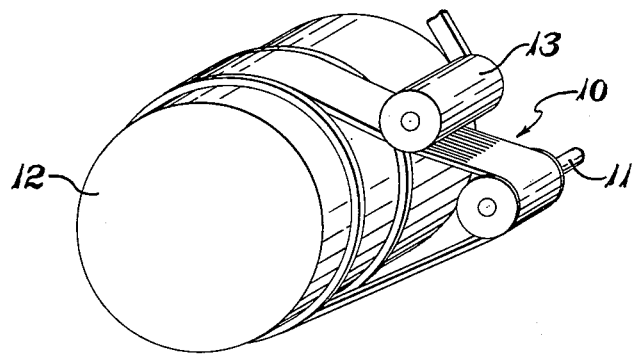
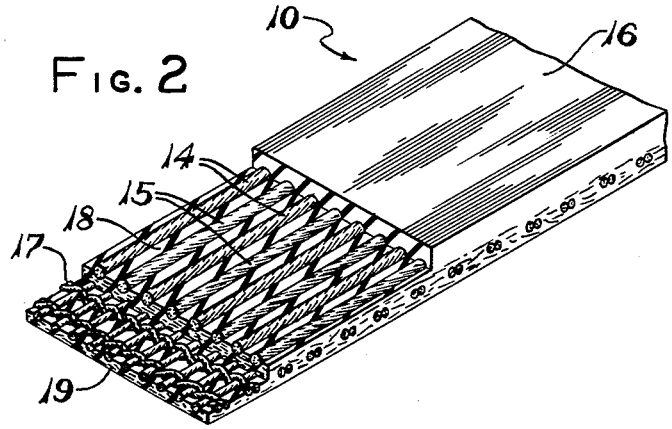
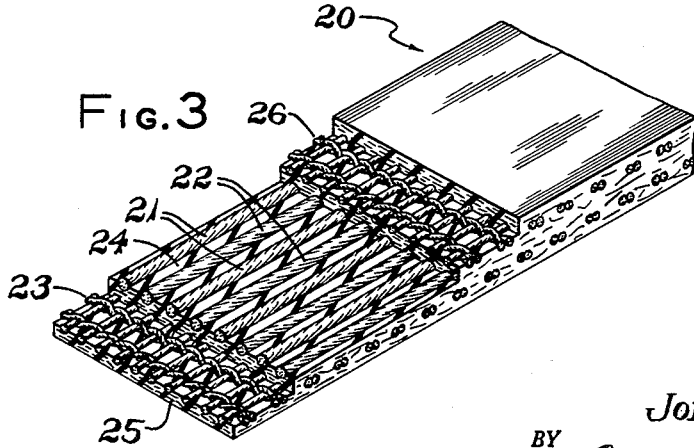
INVENTOR.
JOHN L. FIHE

United States Patent Office 3,122,934
Patented Mar. 3, 1964

3,122,934
POWER TRANSMISSION BELT
John L. Fihe, Akron, Ohio, assignor to The B. F. Goodrich Company, New York, N.Y., a corporation of New York
Filed Dec. 20, 1960, Ser. No. 77,151
7 Claims. (Cl. 74—232)

This invention relates to power transmission belts and, more particularly, to belts of this type which are flat and endless with the lateral dimension a number of times greater than the thickness.

Domestic clothes driers, as presently constructed, comprise a rotatable drum in which the clothes are placed. This drum is rotated by an electric motor through a belt drive with the desired speed reduction being effected by having the belt extend from a small diameter pulley on the motor directly to a large diameter pulley or to the outer surface of the drum itself which has a diameter many times that of the motor pulley. This requires that the belt be circumferentially highly flexible yet laterally stiff. Moreover, the belt must be capable of withstanding heat, abrasion and oil or grease. In addition to use in clothes driers, there are a number of other apparatus which require a power transmission belt of these characteristics.

The principal object of this invention is, therefore, to provide an improved flat, endless, power transmission belt of low extensibility and minimum thickness by employing as the tensile layer thereof a single layer of helically wound cord which is laterally stabilized and prevented from lateral cracking or separation by a cover comprising a stiff elastomer and a laterally strong fabric.

A further object of the invention is to provide an improved power transmission belt of the type defined in the preceding paragraph wherein the elastomer uniting the tension-resting cords and the fabric is a neoprene-containing compound reinforced with carbon black and with the portion of the elastomer on at least the inner surface of the belt containing fibers.

A still more specific object of the invention is to provide an improved power transmission belt of the type defined in the preceding paragraphs wherein lateral stability of the belt is provided by the tensile layer thereof being formed of twisted cords wound helically about the belt with the direction of twist of the cords in part of the convolutions reversed with respect to the direction of twist of the remainder of the convolutions, and separation of the cord convolutions is prevented, at least in part, by a woven fabric reinforcement of the type which has high transverse strength.

The invention further resides in certain novel features of construction and in the combination and arrangement of the components comprising the belt which, together with further advantages of the belt, will be hereinafter apparent from the following detailed description of the presently preferred embodiment described with reference to the accompanying drawing, forming a part of this application, and in which:

FIG. 1 is an oblique, somewhat schematic, view showing a belt embodying this invention trained about a driving pulley and a driven drum, the diameter of the latter being many times that of the former;

FIG. 2 is an enlarged fragmentary perspective view of a portion of the belt shown in FIG. 1 with parts thereof broken away and certain of the remaining portions shown in section to more clearly illustrate the nature and arrangement of the components; and FIG. 3 is a view similar to FIG. 2 but illustrating a modification.

A belt 10, constructed in accordance with this invention, is of the flat type with the thickness a fraction only of the lateral dimension. Such a belt, as shown in FIG. 1, may be employed as the speed reducing driving connection between a driving pulley or shaft 11 and a driven cylinder or drum 12 which, by way of example, may be the rotatable drum of a domestic clothes drier. The belt 10 suitable for this purpose must, as mentioned above, be of low extensibility yet highly circumferentially flexible to permit continuous trouble-free operation about rotatable members of greatly differing diameters without cracking or other failure. Moreover, it should have a high coefficient of friction on its driving surface. Furthermore, the belt must be laterally stable and relatively stiff to prevent it from riding up the flanges of the pulleys about which it passes or otherwise being improperly laterally flexed by small irregularities of either temporary or permanent nature upon the surfaces about which it moves. A belt of this type may be subject to action of a belt tightener, a guiding pulley, or power take-off, such as indicated by the pulley 13, riding on the outer surface of the belt and, hence, the latter must be abrasion resistant on both the inner and outer surfaces.

A belt having the desired characteristics is, in accordance with this invention, formed of a central tension-resisting layer formed of low elongation tensile elements extending circumferentially of the belt and united by a heat, abrasion and oil-resistant elastomer with lateral reinforcement being provided by a laterally strong fabric on at least the radially inner surface of the tension layer. Further lateral stiffening and increase in the coefficient of friction of the belt surface are provided by fibers incorporated in the elastomer covering the said fabric.

The low elongation tension-resisting elements of the belt illustrated in FIG. 2 are formed of helically wound twisted cords 14 and 15, each comprising a plurality of low elongation filaments twisted together as, for example, twisted yarns of rayon, "Dacron" (a condensation polymer of dimethyl terephthalate and ethylene glycol), or equivalent materials. These cords are wound helically with respect to the circumference of the belt 10 with adjacent convolutions of the cords being of reverse twist. Thus, if the cord 14 has the yarns thereof twisted together in the left-hand or counterclockwise direction, the next adjacent cord convolution 15 will have the yarns thereof twisted together in the right-hand or clockwise direction with this relationship of the cords repeated throughout the entire lateral extent of the belt. Lateral separation of the cord convolutions, in the embodiment illustrated in FIG. 2, is prevented, in part, by the radially outer covering 16 which is preferably a stiff elastomer that is oil, heat and abrasion resistant. Lateral separation of the cords is further prevented and cracking of the cover 16 resisted by providing a radially inner backing for the belt in the form of a laterally strong fabric 17 which is provided with an elastomer coating or covering 18 that preferably is substantially of the same composition as the cover 16 but with the addition thereto of fibers 19.

In one specific example of the invention the fabric 17 was a leno weave of nylon threads and the elastomeric covering or coating 18 on both sides thereof had the following composition:

| | Parts by weight |
|---|---|
| Elastomer | 100.00 |
| Carbon black | 80.00 |
| Cellulose fiber | 15.00 |
| Curing agents | 14.50 |
| Curing accelerator | .50 |
| Curing regulator | .75 |
| Softeners | 8.50 |
| Natural fatty acids | 3.00 |
| Antioxidant | 2.00 |
| Total | 224.25 |

In the above compound, all parts are parts by weight based upon the weight of the elastomer. The elastomer comprises 85 parts neoprene and 15 parts styrene-butadiene rubber while the cellulose fiber is cotton linters. The curing agents are magnesium oxide 4.5 parts and zinc oxide 10 parts. The accelerator is benzo-thiazyl-disulfide and the regulator is sodium acetate. The softeners, age resistors and fatty acids are conventional and may be selected from those well known to compounders of elastomers.

The backing fabric 17 has the elastomeric coating or covering 18 calendered thereon with the calendered gauge of the material being in the order of .020 inch. A sheet of this material is wrapped in a single convolution about a building drum having a diameter corresponding to the internal diameter of the completed belt. Upon this elastomer coated fabric is helically wound a pair of rayon cords 14 and 15, one of which has the filaments thereof twisted in the counterclockwise direction and the other of which has the cords twisted in the clockwise direction. These cords are wound simultaneously in side-by-side relationship so that the convolutions of one interfit the convolutions of the other, the cord windings extending substantially the entire axial length of the elastomer coated fabric. Over the thus wound cords is then applied a sheet of stiff elastomeric material which has a thickness in the order of .010 to .012 inch and the following composition:

| | Parts |
|---|---|
| Elastomer | 100.00 |
| Carbon black | 80.00 |
| Curing agents | 14.50 |
| Accelerator | .50 |
| Regular | .75 |
| Softeners | 11.75 |
| Antioxidant | 2.00 |
| Natural fatty acids | 5.00 |
| Total | 214.50 |

In this composition the elastomer is preferably all neoprene while the curing agents, accelerator, regulator, softeners, antioxidant and fatty acids are the same as those employed in the compound used to coat the backing fabric 17.

The thus assembled components are then provided with a cloth wrapping and are subjected to a curing temperature while still mounted upon the drum. After the curing is completed, the wrapping is removed and the material on the drum may be cut into a plurality of belts of desired width. In the construction just described the belts had a thickness in the order of 0.057 inch with the width of the belts being 0.50 inch and their inside circumference 87.5 inches. Belts of this type have been found to have excellent abrasion and crank resistance, low extensibility, good heat resistance and a high coefficient of friction so that they have proved satisfactory for driving the drums of clothes driers.

FIG. 3 illustrates another embodiment of the invention wherein a flat power transmission belt embodying the principles of this invention has the radially outer surface, as well as the radially inner surface, provided with a fabric reinforcement. As shown in this embodiment, the belt 20 comprises a central tension-resisting layer formed of low elongation tension-resisting elements 21 and 22 each comprising a plurality of low elongation filaments twisted together with the cords being of reverse twist and wound side by side in forming the belt. Thus, the cords 21 and 22 may be identical to the cords 14 and 15 in the embodiment illustrated in FIG. 2. Likewise, the belt 20 has the radial inner surface provided by an elastomer coated laterally strong fabric 23. This fabric may be identical with the fabric 17 and the elastomer 24 coating the fabric preferably has the same composition as the coating 18 for the belt 10. Hence, this belt also has the radial inner surface provided with a carbon black reinforced neoprene containing fibers 25.

The belt 20, illustrated in FIG. 3, differs from the belt 10 in FIG. 2, however, in that the radially outer surface is formed like the radially inner surface. Thus, the belt 20 has the radially outer surface provided by an elastomer coated laterally strong fabric 26 which may be the same material as the reinforcing fabric employed for the radially inner surface of the belt, this fabric being coated with an elastomeric compound containing fibers of a composition that may be the same as the composition employed on the radially inner surface of the belt and which, as noted above, is the same as the composition employed for the radially inner surface of the belt 10. A belt of the construction just described, and which is illustrated in FIG. 3, possesses the same advantageous characteristics and properties as the belt 10 illustrated in FIG. 2 and has the additional advantage of a high coefficient of friction on its radially outer surface as well as high abrasion resistance on the inner surface so that a power take-off may be used on the outer surface without injury to the belt.

Although the invention has been described with reference to two specific examples, it will be apparent that variations may be made in the compositions and dimensions herein set fourth without departing from the principles of the invention. Thus, while neoprene is the preferred elastomer, other elastomers of equivalent characteristics may be employed. In this regard it should be noted that the specific composition given for the covering or outer surface 16 of the belt illustrated in FIG. 2 has a reading on the type A Shore durometer of 70 while the elastomeric material with the fibers employed on the inner surface of that belt and on both surfaces of the belt illustrated in FIG. 3 has a reading on the type A Shore durometer of 80. While these are the preferred values, it will be evident that some variation in the stiffness of the elastomers may be tolerated. Thus, the composition of the covering 16 may have a durometer reading of from 60 to 75 while that of the fiber containing elastomer may be in the range of 70 to 85. Furthermore, while the tensile-resisting cords in the specific examples were rayon, other low elongation tensile-resisting materials may be employed. Also, it is not necessary that the direction of twist of the immediately adjacent convolutions be reversed so long as the cords in one-half of the total cord convolutions have the twist thereof in one direction and the cords in the other half of the convolutions are twisted in the opposite direction. It is also not essential that the reinforcing fabric be formed of leno woven nylon threads since other materials and weaves of equivalent lateral strength may be employed. Finally, the fibers in the elastomer need not be cotton linters but may be fibers of other textile materials or of leather.

Moreover, although the invention has been described with particular reference to use of the belt for driving clothes driers, belts of this construction are not limited to such use but can be employed advantageously for high speed, low power operations such as in textile manufacture and similar operations. Consequently, the invention

Having thus described the invention, I claim:

1. An endless flat power transmission belt comprising a single layer of multiple convolutions of helically wound tension-resisting cord embedded in an elastomer and laterally reinforced on at least its radially inner surface by laterally strong fabric coated with an elastomer containing fibers, the said fabric being disposed with the direction of its lateral strength transversely of the belt.

2. An endless flat power transmission belt comprising a single layer of multiple convolutions of helically wound tension-resisting cord embedded in elastomer and laterally reinforced on both its radially inner and outer surfaces by laterally strong fabric coated with an elastomer containing fibers, the said fabric being disposed with the direction of its lateral strengtt transversely of the belt.

3. An endless flat power transmission belt comprising a single layer of multiple convolutions of helically wound tension-resisting cord covered on the radially outer surface with a layer of carbon black reinforced neoprene and on its radially inner surface by a laterally strong fabric coated with a carbon black reinforced neoprene compound containing fibers, the said fabric being disposed with the direction of its lateral strength transversely of the belt.

4. An endless flat power transmission belt comprising a single layer of multiple convolutions of helically wound tension-resisting cord of low extensibility covered on the radially outer surface thereof with a layer of elastomer having a type A Shore durometer value in the order of 60–75, the radially inner surface of said belt comprising a laterally strong fabric coated with an elastomer containing textile fibers with the said coating having a type A Shore durometer value in the order of 70–85, the said fabric being disposed with the direction of its lateral strength transversely of the belt.

5. A thin endless flat power transmission belt comprising a radially inner layer of a leno weave fabric disposed with its maximum strength transversely of the belt and covered by carbon black reinforced neoprene containing cotton linters, a single ply tension-resisting layer formed of a pair of tension-resisting cords of opposite twist arranged in side-by-side multiple convolution relationship radially outwardly of and united to the said fabric covering, and a cover of carbon black reinforced neoprene united with said cords and comprising the radially outer surface of the belt.

6. A thin endless flat power transmission belt comprising a radially inner layer of a leno weave nylon fabric disposed with the direction of its maximum strength transversely of the belt and coated by neoprene rubber containing cotton linters, the said fabric coating having a type A Shore durometer value in the range of 60–75, a single ply tension-resisting layer formed of a pair of rayon cords of opposite twist arranged in multiple convolution side-by-side relationship and united with the radially outer surface of said neoprene coated fabric, and a cover of carbon black reinforced neoprene having a type A Shore durometer value in the range of 70–85 united with said cords and comprising the radially outer surface of the belt.

7. A thin endless flat power transmission belt comprising a radially inner layer of a leno weave nylon fabric disposed with the direction of its maximum strength transversely of the belt and coated by neoprene rubber containing cotton linters, a single ply tensile-resisting layer formed of a pair of rayon cords of opposite twist arranged in side-by-side multiple convolution relationship and united with the radially outer surface of said neoprene covered fabric, and a radially outer layer of a leno weave nylon fabric disposed with the direction of its maximum strength transversely of the belt and coated by neoprene rubber containing cotton linters united to the radially outer surface of said tensile-resisting layer, the said fabric coating on both the said radially inner and outer fabric layers having a type A Shore durometer value in the range of 60–75.

References Cited in the file of this patent

UNITED STATES PATENTS

| | | |
|---|---|---|
| 1,733,469 | Rogers | Oct. 29, 1929 |
| 2,099,545 | Teisher et al. | Nov. 16, 1937 |
| 2,435,840 | Lesesne | Feb. 10, 1948 |
| 2,461,654 | Nassimbene | Feb. 15, 1949 |
| 2,491,188 | Lesesne | Dec. 13, 1949 |
| 2,526,324 | Bloomfield | Oct. 17, 1950 |
| 2,847,865 | Rockoff et al. | Aug. 19, 1958 |
| 3,078,206 | Skura | Feb. 19, 1963 |

UNITED STATES PATENT OFFICE
CERTIFICATE OF CORRECTION

Patent No. 3,122,934                 March 3, 1964

John L. Fihe

It is hereby certified that error appears in the above numbered patent requiring correction and that the said Letters Patent should read as corrected below.

Column 1, line 37, for "tension-resting" read -- tension-resisting --; column 5, line 18, for "strengtt" read -- strength --; column 6, line 39, for "2,435,840" read -- 2,435,749 --; same column 6, after line 45, insert the following:
FOREIGN PATENTS 1,066,064   Germany---------Sept. 24, 1959

Signed and sealed this 15th day of September 1964.

(SEAL)
Attest:

ERNEST W. SWIDER
Attesting Officer

EDWARD J. BRENNER
Commissioner of Patents